United States Patent
Chen et al.

(10) Patent No.: US 11,650,489 B2
(45) Date of Patent: May 16, 2023

(54) OPTICAL ENGINE MODULE WITH FAN ASSEMBLY FOR HEAT DISSIPATION AND PROJECTOR HAVING THE SAME

(71) Applicant: Coretronic Corporation, Hsin-Chu (TW)

(72) Inventors: Jhih-Tong Chen, Hsin-Chu (TW); Jia-Hong Dai, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/167,031

(22) Filed: Feb. 3, 2021

(65) Prior Publication Data
US 2021/0247675 A1    Aug. 12, 2021

(30) Foreign Application Priority Data
Feb. 7, 2020   (CN) .......................... 202020155392.X

(51) Int. Cl.
*G03B 21/16* (2006.01)
*G03B 21/14* (2006.01)

(52) U.S. Cl.
CPC ........... *G03B 21/16* (2013.01); *G03B 21/145* (2013.01)

(58) Field of Classification Search
CPC ..... G03B 21/16; G03B 21/145; H04N 9/3144
See application file for complete search history.

(56) References Cited

U.S. PATENT DOCUMENTS

| | | | | |
|---|---|---|---|---|
| 5,772,300 A * | 6/1998 | Kitai | ................ | G02F 1/133382 349/161 |
| 6,007,205 A * | 12/1999 | Fujimori | ............... | G03B 21/16 353/57 |
| 6,179,424 B1 * | 1/2001 | Sawamura | ........ | G02B 26/0841 348/771 |
| 8,540,374 B2 * | 9/2013 | Egawa | .................. | G03B 21/16 353/57 |
| 11,036,119 B2 * | 6/2021 | Tsai | .................. | G03B 21/2033 |
| 2002/0033992 A1 * | 3/2002 | Den Bossche | ........ | G03B 33/12 359/291 |
| 2005/0122482 A1 * | 6/2005 | Ellis | ...................... | G03B 21/16 353/61 |
| 2010/0118279 A1 * | 5/2010 | Itsuki | .................. | H04N 9/3144 353/54 |

(Continued)

FOREIGN PATENT DOCUMENTS

CN   206674407   11/2017

*Primary Examiner* — Bao-Luan Q Le
(74) *Attorney, Agent, or Firm* — JCIPRNET

(57) ABSTRACT

The invention provides an optical engine module and a projector including the optical engine module. The optical engine module includes a casing, a light valve, a prism assembly and a fan assembly. The casing has an assembly port. The light valve is disposed at the assembly port and defines an accommodating space with the casing. The prism assembly is disposed in the accommodating space, and the light valve is configured to convert an illumination beam from the prism assembly into an image beam. The prism assembly includes a first region and a second region. The first region includes a light incident surface of the prism assembly, and a temperature of the second region is higher than a temperature of the first region. The fan assembly is disposed in the accommodating space. Airflow provided by the fan assembly circulates in the accommodating space.

24 Claims, 6 Drawing Sheets

(56) References Cited

U.S. PATENT DOCUMENTS

| | | | |
|---|---|---|---|
| 2011/0032486 A1* | 2/2011 | Egawa | H04N 9/3144 |
| | | | 353/31 |
| 2011/0037954 A1* | 2/2011 | Tsuchiya | H04N 9/3164 |
| | | | 353/54 |
| 2011/0211166 A1* | 9/2011 | Kawano | H04N 9/3144 |
| | | | 353/20 |
| 2011/0234984 A1* | 9/2011 | Egawa | G03B 21/18 |
| | | | 353/31 |
| 2013/0314600 A1* | 11/2013 | Asano | H04N 9/3144 |
| | | | 348/571 |
| 2018/0011392 A1* | 1/2018 | Utsunomiya | G03B 21/16 |
| 2018/0239225 A1* | 8/2018 | Zhong | G02B 26/0833 |
| 2018/0348612 A1* | 12/2018 | Nakajima | G03B 21/16 |
| 2019/0094669 A1* | 3/2019 | Yanagisawa | G03B 21/2073 |
| 2021/0124245 A1* | 4/2021 | Tsai | G03B 21/008 |

* cited by examiner

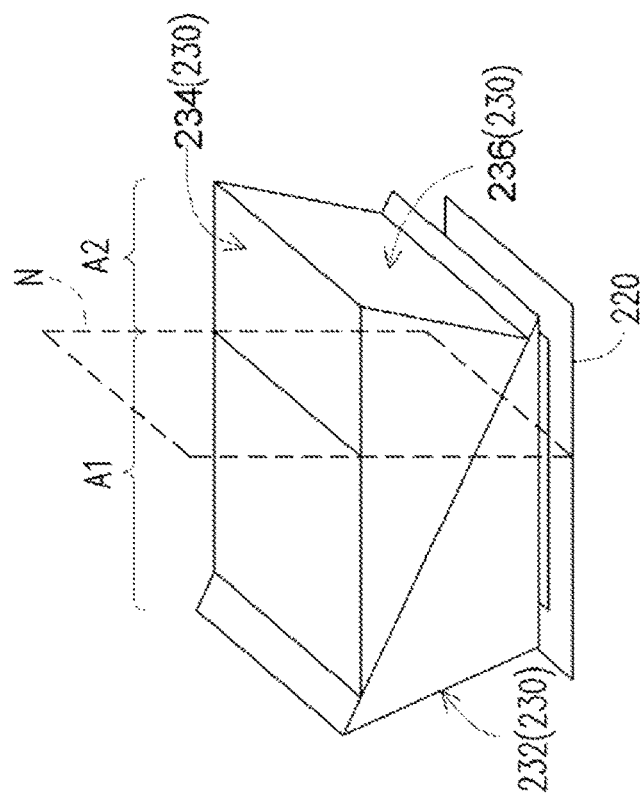
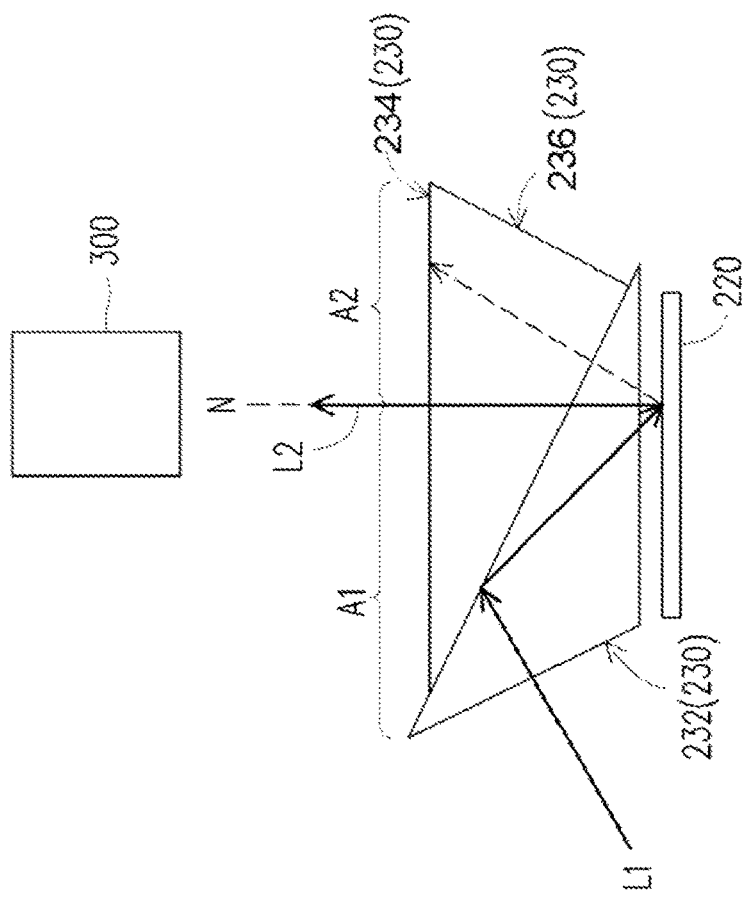
FIG. 2C
FIG. 2B

OPTICAL ENGINE MODULE WITH FAN ASSEMBLY FOR HEAT DISSIPATION AND PROJECTOR HAVING THE SAME

CROSS-REFERENCE TO RELATED APPLICATION

This application claims the priority benefit of China application serial no. 202020155392.X, filed on Feb. 7, 2020. The entirety of the above-mentioned patent application is hereby incorporated by reference herein and made a part of this specification.

BACKGROUND OF THE INVENTION

1. Field of the Invention

The invention relates to an optical device and a projector, and in particular, to an optical engine module and a projector including the optical engine module.

2. Description of Related Art

In a projector, assemblies such as light valves, rods, optical lenses, prisms or the like are susceptible to dust or dirt so as to affect projection quality. These assemblies need to be placed in an airtight cavity. For example, the prism may be disposed in an accommodating space and dissipates heat only by natural convection, so a heat dissipation effect is often poor. Since the prism emits heat after being irradiated with light and cold and hot air around the prism is unevenly distributed, it is necessary to improve airflow circulation in the closed accommodating space. In addition, the prism may be coated with a black body, and the black body also has the problem of poor heat dissipation due to the absorption of light and may worsen uneven distribution of the cold and hot air, thereby affecting the projection quality.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The invention provides an optical engine module, which can improve a heat dissipation effect of optical assemblies in an accommodating space and achieve better projection quality.

The invention provides a projector, including the above-mentioned optical engine module. The above-mentioned projector has better heat dissipation efficiency and can achieve better projection quality.

In order to achieve one or a part or all of the above-mentioned objectives or other objectives, an embodiment of the invention provides an optical engine module, including a casing, a light valve, a prism assembly and a fan assembly. The casing has an assembly port. The light valve is disposed at the assembly port and defines an accommodating space with the casing. The prism assembly is disposed in the accommodating space, and the light valve is configured to convert an illumination beam from the prism assembly into an image beam. The prism assembly includes a first region and a second region. The first region includes a light incident surface of the prism assembly, and a temperature of the second region is higher than a temperature of the first region. The fan assembly is disposed in the accommodating space, and airflow provided by the fan assembly circulates in the accommodating space.

In order to achieve one or a part or all of the above-mentioned objectives or other objectives, an embodiment of the invention provides a projector, including an illumination system, an optical engine module and a projection lens. The illumination system is configured to provide an illumination beam. The optical engine module includes a casing, a light valve, a prism assembly and a fan assembly. The casing has an assembly port. The light valve is disposed at the assembly port and defines an accommodating space with the casing. The prism assembly is disposed in the accommodating space, and the light valve is configured to convert an illumination beam from the prism assembly into an image beam. The prism assembly includes a first region and a second region. The first region includes a light incident surface of the prism assembly, and a temperature of the second region is higher than a temperature of the first region. The fan assembly is disposed in the accommodating space, and airflow provided by the fan assembly circulates in the accommodating space. The projection lens is disposed on a transmission path of the image beam and configured to project the image beam.

Based on the above, the embodiments of the invention have at least one of the following advantages or effects. In the optical engine module of the invention, the prism assembly is disposed in the accommodating space and includes the first region and the second region, the fan assembly is disposed in the accommodating space, the fan assembly can provide the airflow, and the airflow circulates in the accommodating space, thereby improving the heat dissipation effect of the prism assembly in the accommodating space and achieving better projection quality. In addition, the projector of the embodiment of the invention includes the above-mentioned optical engine module, and thus, has better heat dissipation efficiency and can achieve better projection quality.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 2B shows a schematic diagram of a light valve and a prism assembly of the optical engine module of the embodiment of FIG. 2A and a projection lens.

FIG. 2C shows a schematic three-dimensional diagram of the light valve and the prism assembly of the optical engine module of the embodiment of FIG. 2A.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
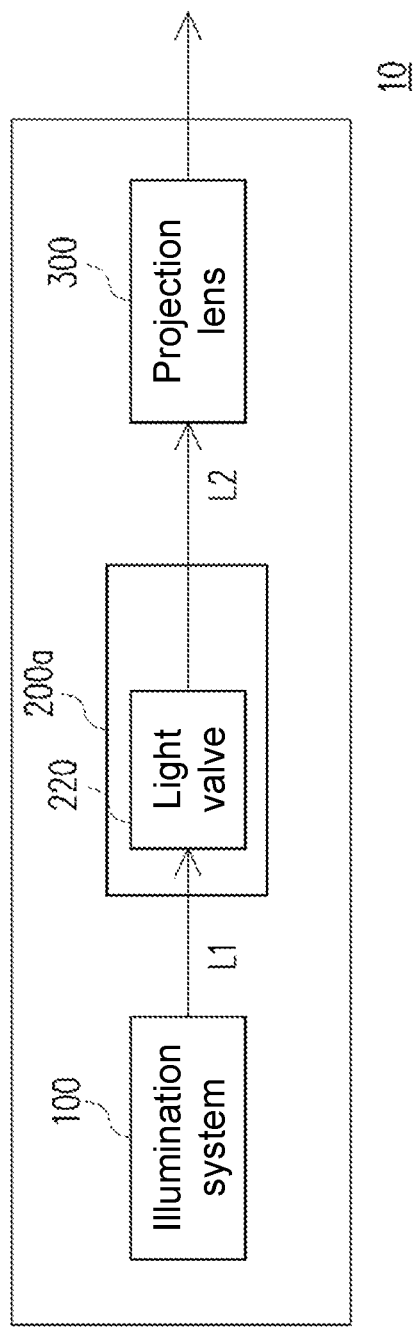
FIG. 1 shows a schematic diagram of a projector of an embodiment of the invention.

FIG. 1 shows a schematic diagram of a projector of an embodiment of the invention. Referring to FIG. 1, in the present embodiment, the projector 10 includes an illumination system 100, an optical engine module 200a and a projection lens 300. The illumination system 100 is configured to provide an illumination beam L1. A light valve 220 of the optical engine module 200a is located on a transmission path of the illumination beam L1, and the light valve 220 is configured to convert the illumination beam L1 into an image beam L2. The projection lens 300 is disposed on a transmission path of the image beam L2 and configured to project the image beam L2.

In some embodiments, for example, a light source of the illumination system 100 includes a laser diode (LD), for example, a laser diode bank. However, the invention is not limited thereto. In some embodiments, the light valve 220 includes, for example, reflective light modulators such as a liquid crystal on silicon panel (LCoS panel) and a digital micro-mirror device (DMD). In some embodiments, the light valve 220 may include penetrating light modulators such as a transparent liquid crystal panel, an electro-optical modulator, a maganeto-optic modulator, and an acousto-optic modulator (AOM). However, the invention does not limit a form and a type of the light valve 220. The light valve 220 may convert the illumination beam L1 into the image beam L2. For example, the illumination beam L1 may include an excitation beam and a converted beam provided by a wavelength conversion device. For the method, detailed steps, and implementation manners for the light valve 220 to convert the illumination beam L1 into the image beam L2, sufficient teachings, suggestions and implementation instructions can be obtained from general knowledge in the technical field to which they belong, and therefore, the descriptions thereof are omitted. In some embodiments, the projection lens 300 may include, for example, one or more optical lenses with same or different refractive powers, and various combinations thereof, and includes, for example, non-planar lenses such as a biconcave lens, a biconvex lens, a concavo-convex lens, a convexo-concave lens, a plano-convex lens and a plano-concave lens, and various combinations thereof. In some embodiments, the projection lens 300 may also include a planar optical lens to project the image beam from the light valve 220 out of the projector 10 in a reflective or penetrating manner. The invention does not limit the form and the type of the projection lens 300 herein.

Figure 2A:
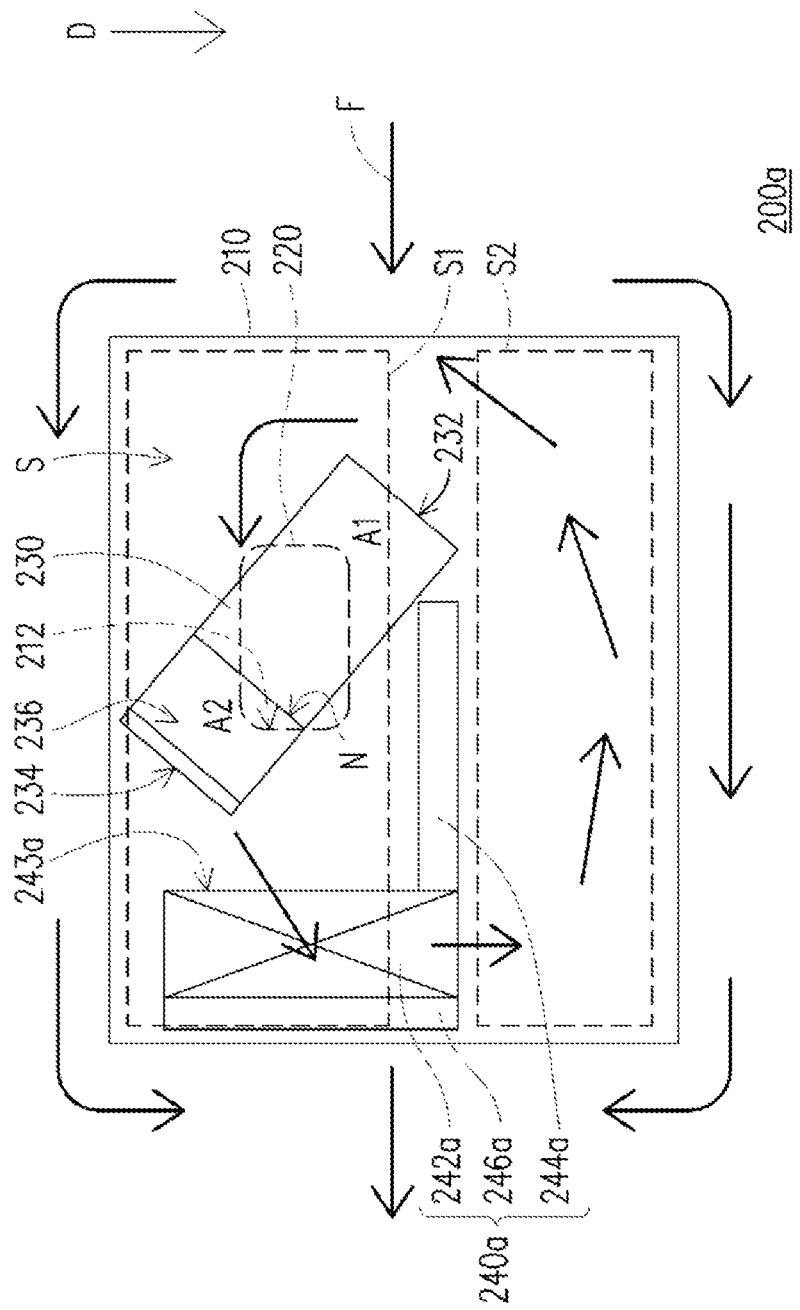
FIG. 2A shows a schematic diagram of an optical engine module of an embodiment of the invention.

FIG. 2A shows a schematic diagram of an optical engine module of an embodiment of the invention. FIG. 2B shows a schematic diagram of a light valve and a prism assembly of the optical engine module of the embodiment of FIG. 2A and a projection lens. FIG. 2C shows a schematic three-dimensional diagram of the light valve and the prism assembly of the optical engine module of the embodiment of FIG. 2A. Referring to FIG. 2A, FIG. 2B and FIG. 2C, an optical engine module 200a of the present embodiment includes a casing 210, a light valve 220, a prism assembly 230 and a fan assembly 240a. The casing 210 has an assembly port 212, the light valve 220 is disposed at the assembly port 212 of the casing 210, and the light valve 220 defines an accommodating space S with the casing 210. In some embodiments, the prism assembly 230 includes, for example, a total internal reflection prism (TIR prism), and the accommodating space S may be a closed space to prevent dirt from entering. In some embodiments, for the total internal reflection prism (TIR prism), the prism assembly 230 includes two lenses. Generally, the two lenses of the prism assembly 230 may be disposed such that large-angle incident light is totally reflected to be transmitted to the light valve, and penetrates the prism assembly 230 and exits from the projection lens after being modulated by the light valve. However, small-angle incident light may penetrate the two lenses, and/or may partially enter the projection lens to form stray light after being reflected many times, so that picture contrast is reduced.

In the present embodiment, the prism assembly 230 is disposed in the accommodating space S, and the prism assembly 230 may be regarded as a heat source after being irradiated by light. As shown in FIG. 2A and FIG. 2B, the prism assembly 230 includes a first region A1 and a second region A2. The first region A1 may include a light incident surface 232 of the prism assembly 230, and a temperature of the second region A2 may be higher than a temperature of the first region A1. That is, compared with the first region A1, the second region A2 is a main heating region. The fan assembly 240a is disposed in the accommodating space S. Airflow provided by the fan assembly 240a circulates in the accommodating space S.

In some embodiments, external airflow F may be provided outside the casing 210 to dissipate heat for the casing 210.

In detail, the first region A1 and the second region A2 of the prism assembly 230 of the present embodiment may be divided by a normal plane N perpendicular to the light valve 220. In some embodiments, as shown in FIG. 2B and FIG. 2C, the normal plane N may be a surface perpendicular to the light valve 220, and evenly divide the light valve 220 into two half vertical planes (orthogonal planes), so that the first region A1 and the second region A2 of the prism assembly 230 have substantially same or similar volumes. The invention is not limited thereto. In other embodiments, the normal plane N may not evenly divide the light valve 220, so that the first region A1 and the second region A2 may also have different volumes. Furthermore, as shown in FIG. 2B, the prism assembly 230 of the present embodiment may further include a light receiving surface 234 and a light absorbing surface 236, and the light absorbing surface 236 may be disposed opposite to the light incident surface 232. The second region A2 of the prism assembly 230 includes at least parts of the light receiving surface 234 and the light absorbing surface 236. The light absorbing surface 236 may be adjacent to the light receiving surface 234. In some embodiments, the light absorbing surface 236 and/or the light receiving surface 234 may be partially coated with an opaque black coating (such as black paint) to facilitate absorption of non-exiting light. Specifically, as shown in FIG. 2B, after entering the prism assembly 230 at a large angle, the illumination beam L1 is modulated into an image beam L2 by the light valve 220 (reflective light modulator). When a microstructure of the light valve 220 is in a first state (also referred to as "state on"), the image beam L2 exits from the projection lens 300, and when the microstructure of the light valve 220 is in a second state (also referred to as "state off"), the image beam L2 may be, for example, transmitted to the light receiving surface 234, so as to be absorbed by the black coating coated on the light receiving surface 234. Furthermore, after entering the prism assembly 230 at a small angle (not shown), the illumination beam L1 is absorbed by the black coating coated on the light absorbing surface 236 after being reflected many times.

In the present embodiment, as shown in FIG. 2A, the fan assembly 240a includes a fan 242a and a flow guide 244a. The flow guide 244a may roughly divide the accommodating space S into a first subspace S1 and a second subspace S2. That is, the flow guide 244a may be partially located between the first subspace S1 and the second subspace S2. In some embodiments, in the casing 210, an extending direction of the flow guide 244a may be parallel to a direction of airflow at an air inlet 243a of the fan 242a, but is not limited thereto. Further, at the prism assembly 230 in the casing 210, the airflow provided by the fan assembly 240a may flow in a direction from the first region A1 with the lower temperature to the second region A2 with the higher temperature. In an embodiment not shown, an extending direction of a flow guide may also be parallel to an airflow direction of an air outlet of the fan. In another embodiment not shown, an extending direction of a flow guide may be parallel to an axial direction of the fan. The above all belong to the scope which the invention intends to protect.

In some embodiments, from a viewing angle of the page, as shown in FIG. 2A, the first subspace S1 and the second subspace S2 are arranged up and down, and therefore, an arrangement direction D (up-down direction) of the first subspace S1 and the second subspace S2 is substantially perpendicular to a flow direction (left-right direction) of the external airflow F.

In some embodiments, the fan 242a includes, for example, an axial flow fan, a blowing fan or a centrifugal fan. In the present embodiment, as shown in FIG. 2A, most of the fan 242a and the prism assembly 230 are located in the first subspace S1, that is, the first subspace S1 accommodates at least 50% or more of volumes of the fan 242a and the prism assembly 230, and the second subspace S2 may be substantially an open region. In the present embodiment, compared with the first region A1, the fan 242a is more adjacent in position to the second region A2 of the prism assembly 230. Further, the air inlet 243a of the fan 242a is more adjacent in position to the second region A2 of the prism assembly 230. In the present embodiment, the fan 242a may draw air from the first subspace S1 and may blow air to the second subspace S2. In the accommodating space S, the air inlet 243a of the fan 242a is adjacent to the second region A2 with the higher temperature, and airflow is formed by the fan 242a and the flow guide 244a, so that the airflow flows from the second region A2 with the higher temperature to the second subspace S2, and the airflow flows from the first region A1 with the lower temperature to the second region A2 with the higher temperature in the first subspace S1 so as to facilitate heat dissipation. Therefore, the airflow may transfer heat of the prism assembly 230 to the casing 210, and then perform heat exchange by the casing 210 and the external airflow F. That is, the flow guide 244a of the present embodiment may place hot air and cold air in different regions, and the fan 242a may be used to accelerate convective circulation of the cold and hot air, thereby improving heat dissipation efficiency of the optical engine module 200a. In a further embodiment, a fan assembly 240a may further include a fixing member 246a, and the fixing member 246a is connected to the flow guide 244a and configured to fix the fan 242a. In an embodiment, the fixing member 246a may be integrally formed with the flow guide 244a, but is not limited thereto.

In the above embodiment, the fan assembly 240a is disposed in the accommodating space S, and the fan assembly 240a may provide the circulating airflow in the accommodating space S, thereby improving heat dissipation efficiency of the optical assembly. By the fan 242a and the flow guide 244a in the accommodating space S, the airflow is blown from the high temperature region of the heat source to the low temperature region in the accommodating space S, thereby achieving even temperature distribution. Specifically, the air inlet 243a of the fan 242a of the present embodiment is adjacent to the second region A2 with the higher temperature of the prism assembly 230. The light receiving surface 234 and/or the light absorbing surface 236 of the second region A2 of the prism assembly 230 may be coated with the black coating, and heat generated by the black coating absorbing light energy may be more efficiently dissipated, thereby improving heat dissipation efficiency of the prism assembly 230. Therefore, the present embodiment can avoid the problem of burnout caused by the black coating absorbing excessive heat, thereby increasing reliability of the optical engine module 200a. In addition, the projector 10 using the optical engine module 200a of the present embodiment can also achieve better projection quality.

It should be noted that the following embodiments and the foregoing embodiments may have same or similar components and component symbols, and therefore, partial content may not be repeated.

Figure 3:
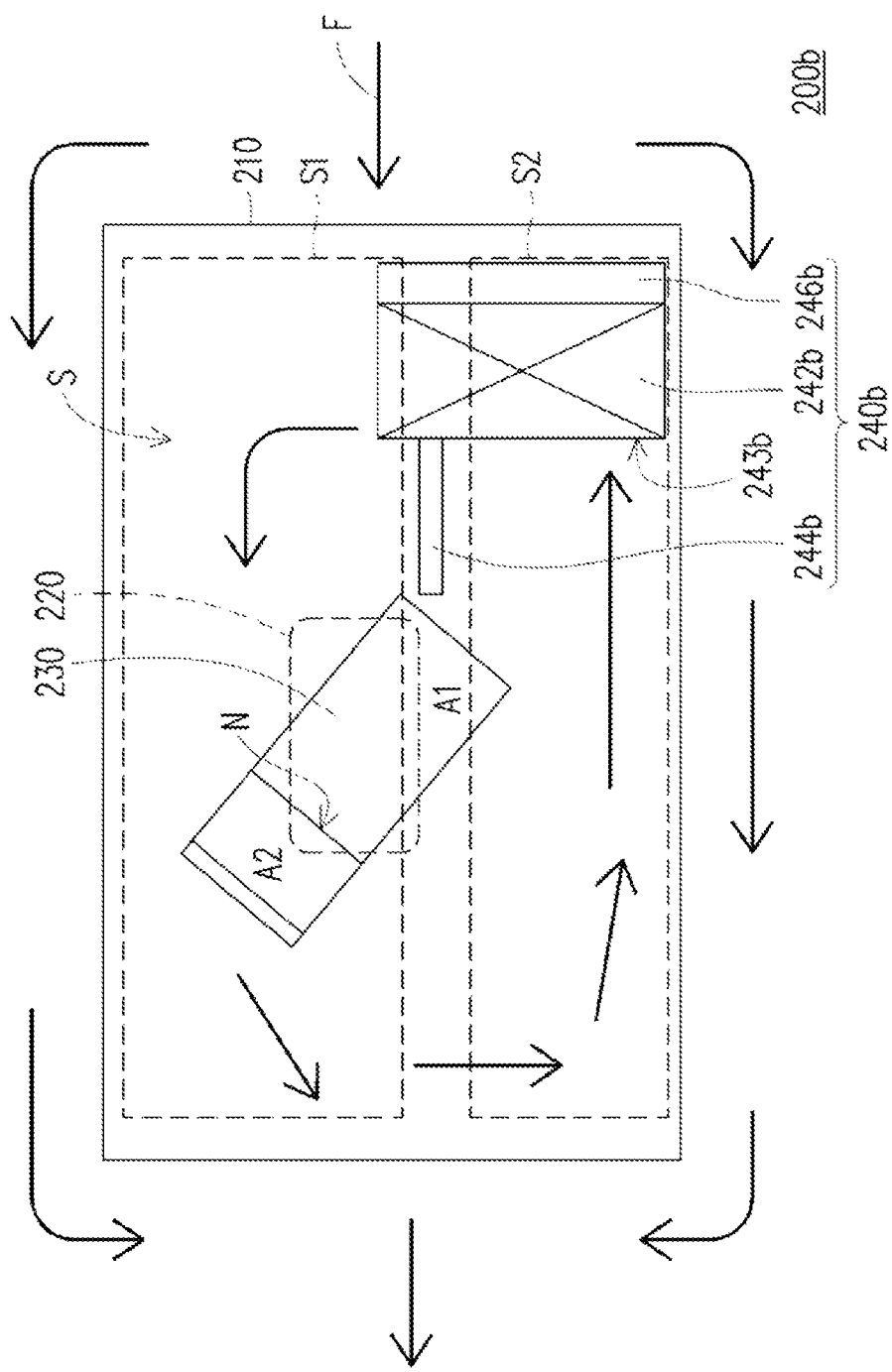
FIG. 3 shows a schematic diagram of an optical engine module of another embodiment of the invention.

FIG. 3 shows a schematic diagram of an optical engine module of another embodiment of the invention. Referring to FIG. 2A and FIG. 3, an optical engine module 200b of the present embodiment is similar to the optical engine module 200a of FIG. 2A. The difference is that most of a fan 242b is located in a second subspace S2, that is, a first subspace S1 accommodates at least 50% or more of a volume of the prism assembly 230, the second subspace S2 accommodates at least 50% or more of a volume of the fan 242b of a fan assembly 240b, and an air inlet 243b of the fan 242b is adjacent to the first region A1 of the prism assembly 230. In the present embodiment, the fan 242b blows air to the first subspace S1 and draws air from the second subspace S2. Airflow is formed by the fan 242b and a flow guide 244b, and the airflow flows from the second region A2 with the higher temperature to the second subspace S2.

Figure 4:
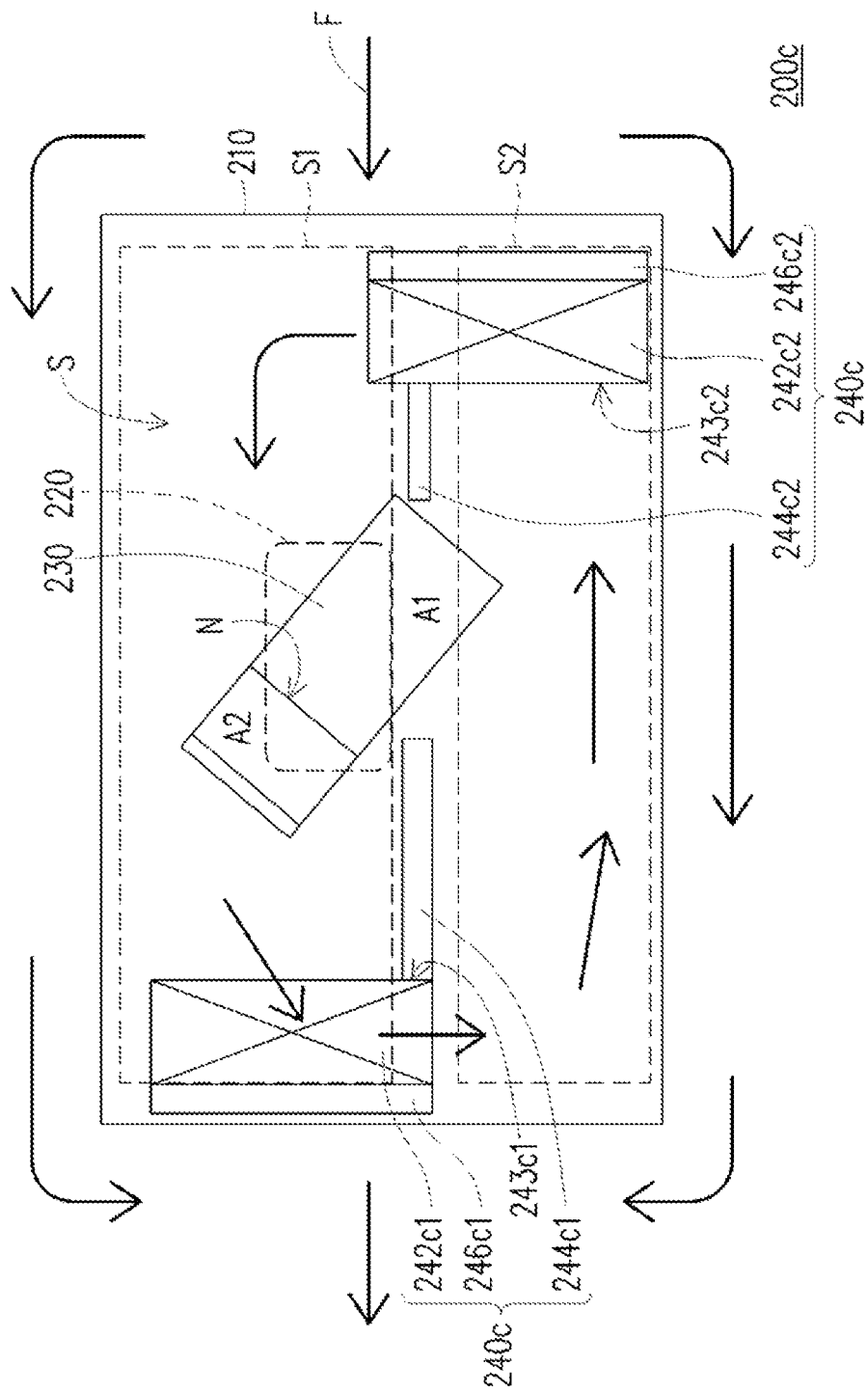
FIG. 4 shows a schematic diagram of an optical engine module of still another embodiment of the invention.

FIG. 4 shows a schematic diagram of an optical engine module of still another embodiment of the invention. Referring to FIG. 2A and FIG. 4, an optical engine module 200c of the present embodiment is similar to the optical engine module 200a of FIG. 2A. The difference is that the fan assembly 240c includes a first fan 242c1, a second fan 242c2, a first flow guide 244c1, a second flow guide 244c2, a first fixing member 246c1 and a second fixing member 246c2. In the present embodiment, an extending direction of the first flow guide 244c1 is opposite and parallel to an extending direction of the second flow guide 244c2. A first subspace S1 accommodates at least 50% or more of volumes of the first fan 242c1 and the prism assembly 230. A first air inlet 243c1 of the first fan 242c1 is adjacent to the second region A2 of the prism assembly 230. A second subspace S2 accommodates the second fan 242c2, and a second air inlet 243c2 of the second fan 242c2 is adjacent to the first region A1 of the prism assembly 230 and is configured to accelerate air flow. In some embodiments, the first fan 242c1 draws air from the first subspace S1 and blows air to the second subspace S2, and/or the second fan 242c2 draws air from the second subspace S2 and blows air to the first subspace S1. That is, hot air from the prism assembly 230 is drawn by the first fan 242c1 of the first subspace S1 to the second subspace S2, and the second fan 242c2 accelerates flow circulation of airflow.

Figure 5:
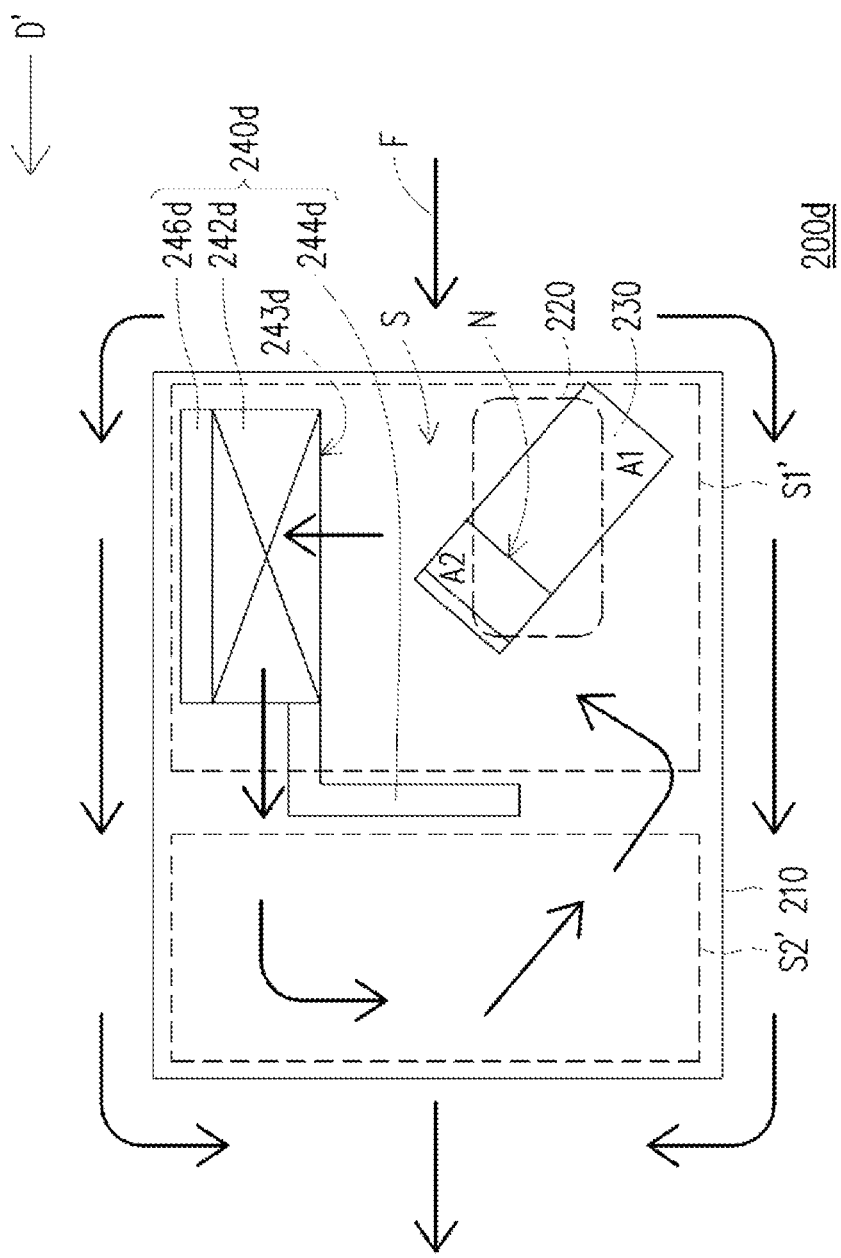
FIG. 5 shows a schematic diagram of an optical engine module of yet another embodiment of the invention.

FIG. 5 shows a schematic diagram of an optical engine module of yet another embodiment of the invention. Referring to FIG. 2A and FIG. 5, an optical engine module 200d of the present embodiment is similar to the optical engine module 200a of FIG. 2A. The difference is that in the present embodiment, an arrangement direction D' (left-right direction) of a first subspace S1' and a second subspace S2' is parallel to the flow direction (left-right direction) of the external airflow F. The first subspace S1' accommodates at least 50% or more of volumes of a fan 242d of a fan assembly 240d and the prism assembly 230, and the second subspace S2' may be substantially an open region. An air inlet 243d of the fan 242d is adjacent to the second region A2 of the prism assembly 230. In some embodiments, the fan 242d draws air from the first subspace S1', and the fan 242d blows air to the second subspace S2. The fan assembly 240d may further include a fixing member 246d, and the fixing member 246d is connected to a flow guide 244d and configured to fix the fan 242d.

Based on the above, the embodiments of the invention have at least one of the following advantages or effects. In the optical engine module of the invention, the prism assembly is disposed in the accommodating space and includes the first region and the second region, the fan assembly is disposed in the accommodating space, the fan assembly can provide the airflow, and the airflow circulates in the accommodating space, thereby improving the heat dissipation effect of the prism assembly in the accommodating space and achieving better projection quality. In addition, the projector of the embodiment of the invention includes the above-mentioned optical engine module, and thus, has better heat dissipation efficiency and can achieve better projection quality.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An optical engine module, comprising:
   a casing, comprising an assembly port;
   a light valve, disposed at the assembly port;
   an accommodating space, formed in the casing;
   a prism assembly, disposed in the accommodating space, the light valve being configured to convert an illumination beam from the prism assembly into an image beam, wherein the prism assembly comprises a first region and a second region, the first region comprises a light incident surface of the prism assembly; and
   a fan assembly, disposed in the accommodating space, and the fan assembly comprises at least one fan and at least one flow guide, wherein an airflow provided by the fan assembly circulates in the accommodating space, and the at least one flow guide divides the accommodating space into a first subspace and a second subspace, and
   wherein the prism assembly further comprises a light absorbing surface, and the light absorbing surface is in the accommodating space, and a distance between the at least one fan and the light absorbing surface of the prism assembly is less than a distance between the at least one fan and the light incident surface of the prism assembly;

wherein at least one fan comprises a first fan and a second fan, the at least one flow guide comprises a first flow guide and a second flow guide, an extending direction of the first flow guide is opposite and parallel to an extending direction of the second flow guide, the first subspace accommodates at least 50% or more of volumes of the first fan and the prism assembly, a first air inlet of the first fan is adjacent to the second region of the prism assembly, the second subspace accommodates the second fan, and a second air inlet of the second fan is adjacent to the first region of the prism assembly.

2. The optical engine module according to claim 1, wherein the first region and the second region of the prism assembly are divided by a normal plane perpendicular to the light valve.

3. The optical engine module according to claim 1, wherein an extending direction of the at least one flow guide is parallel to an airflow direction of an air inlet of the at least one fan.

4. The optical engine module according to claim 3, wherein an arrangement direction of the first subspace and the second subspace is perpendicular to a flow direction of external airflow.

5. The optical engine module according to claim 4, wherein the second subspace accommodates at least 50% or more of a volume of the second fan.

6. The optical engine module according to claim 5, wherein the at least one fan blows air to the first subspace, and the at least one fan draws air from the second subspace.

7. The optical engine module according to claim 1, wherein the at least one fan draws air from the first subspace, and the at least one fan blows air to the second subspace.

8. The optical engine module according to claim 1, wherein the first fan draws air from the first subspace and blows air to the second subspace, and the second fan draws air from the second subspace and blows air to the first subspace.

9. The optical engine module according to claim 3, wherein an arrangement direction of the first subspace and the second subspace is parallel to a flow direction of external airflow.

10. The optical engine module according to claim 9, wherein the at least one fan draws air from the first subspace, and the at least one fan blows air to the second subspace.

11. The optical engine module according to claim 1, wherein the fan assembly further comprises a fixing member, and the fixing member is connected to the at least one flow guide and configured to fix the at least one fan.

12. The optical engine module according to claim 11, wherein the fixing member is integrally formed with the at least one flow guide.

13. The optical engine module according to claim 1, wherein the at least one fan comprises an axial flow fan, a blowing fan or a centrifugal fan.

14. The optical engine module according to claim 1, wherein the prism assembly comprises a light receiving surface, the light absorbing surface is disposed opposite to the light incident surface, and the second region comprises at least parts of the light receiving surface and the light absorbing surface.

15. The optical engine module according to claim 1, wherein the light absorbing surface is partially coated with an opaque black coating.

16. The optical engine module according to claim 1, wherein a volume of the first region of the prism assembly is the same as a volume of the second region.

17. A projector, comprising:
an illumination system, configured to provide an illumination beam;
an optical engine module, comprising:
a casing, comprising an assembly port;
a light valve, disposed at the assembly port;
an accommodating space, formed in casing;
a prism assembly, disposed in the accommodating space, the light valve being configured to convert an illumination beam from the prism assembly into an image beam, wherein the prism assembly comprises a first region and a second region, the first region comprises a light incident surface of the prism assembly; and
a fan assembly, disposed in the accommodating space, and the fan assembly comprises at least one fan and at least one flow guide, wherein an airflow provided by the fan assembly circulates in the accommodating space, and, and the at least one flow guide divides the accommodating space into a first subspace and a second subspace wherein the prism assembly further comprises a light absorbing surface, and the light absorbing surface is in the accommodating space, and a distance between the at least one fan and the light absorbing surface of the prism assembly is less than a distance between the at least one fan and the light incident surface of the prism assembly, and wherein at least one fan comprises a first fan and a second fan, the at least one flow guide comprises a first flow guide and a second flow guide, an extending direction of the first flow guide is opposite and parallel to an extending direction of the second flow guide, the first subspace accommodates at least 50% or more of volumes of the first fan and the prism assembly, a first air inlet of the first fan is adjacent to the second region of the prism assembly, the second subspace accommodates the second fan, and a second air inlet of the second fan is adjacent to the first region of the prism assembly; and
a projection lens, disposed on a transmission path of the image beam and configured to project the image beam.

18. The projector according to claim 17, wherein the first region and the second region of the prism assembly are divided by a normal plane perpendicular to the light valve.

19. The projector according to claim 17, wherein an extending direction of the at least one flow guide is parallel to an airflow direction of an air inlet of the at least one fan.

20. The projector according to claim 19, wherein an arrangement direction of the first subspace and the second subspace is perpendicular to a flow direction of external airflow.

21. The projector according to claim 17, wherein the fan assembly further comprises a fixing member, and the fixing member is connected to the at least one flow guide and configured to fix the at least one fan.

22. The projector according to claim 17, wherein the fan comprises an axial flow fan, a blowing fan or a centrifugal fan.

23. The projector according to claim 17, wherein the prism assembly comprises a light receiving surface, the light absorbing surface is disposed opposite to the light incident surface, and the second region comprises at least parts of the light receiving surface and the light absorbing surface.

24. The projector according to claim 17, wherein a volume of the first region of the prism assembly is the same as a volume of the second region.

\* \* \* \* \*